Sept. 22, 1964         J. J. L. GODAT ETAL         3,149,796
AUTOMATIC FILM TRANSPORT LOCK AND DRIVE MECHANISM
Filed Nov. 13, 1962                                    4 Sheets-Sheet 1

INVENTOR.
JEAN J. L. GODAT
LEIF PEDERSEN
BY
ATTORNEY.

INVENTOR.
JEAN J. L. GODAT
LEIF PEDERSEN

INVENTOR.
JEAN J. L. GODAT
LEIF PEDERSEN

BY

ATTORNEY.

United States Patent Office 3,149,796
Patented Sept. 22, 1964

3,149,796
AUTOMATIC FILM TRANSPORT LOCK AND
DRIVE MECHANISM
Jean J. L. Godat, Poughkeepsie, and Leif Pedersen, South
Salem, N.Y., assignors to General Precision, Inc., a
corporation of Delaware
Filed Nov. 13, 1962, Ser. No. 236,820
6 Claims. (Cl. 242—55.12)

This invention relates to film transport mechanisms and more particularly to a novel automatic lock and drive device which automatically locks the film spool drive mechanism during film removal and automatically unlocks the spool drive mechanism and provides a driving connection between the spool and the film spool drive mechanism when the film and spool are returned to the normal operating position.

In the subject device the film is supported on two spools located on opposite sides of a viewing area. A sprocket wheel drives the film which in turn drives the supply spool. Either spool may be considered the supply spool since the film may be driven in either direction. Therefore, a positive drive mechanism is provided between the two spools so that they will be driven in synchronism. In order to maintain the proper tension on the film at all times, a conventional spring is provided in one spool to compensate for the different effective diameters of the two spools as film is moved from one spool to the other.

This, however, poses a problem when the film is to be removed since the spring will unwind through the drive interconnecting the spools when the film is removed. To avoid the unwinding both the spool containing the spring and the interconnecting drive must be locked. The invention is concerned with the interconnecting drive locking mechanism.

One object of this invention is to provide an automatic film spool drive and lock mechanism which is compact and light in weight.

Another object of the invention is to provide an automatic film spool drive and lock mechanism which is easily operated and requires only the insertion and withdrawal of the film spool to establish the drive and lock conditions, respectively.

A further object of the invention is to provide a mechanism as set forth above which is inexpensive to manufacture, reliable in operation and has a long and trouble-free life.

The invention contemplates an automatic film spool drive and lock mechanism comprising a drive means, a film spool, fixed support means on which said drive means and spool are operatively mounted, and means fixed to said drive means for drivingly engaging said fixed means when the spool is removed from its operative position to prevent the drive means from rotating with respect to the fixed means.

The foregoing and other objects and advantages of the invention will become more apparent from a careful consideration of the specification and drawing wherein two embodiments of the invention are described and shown for illustration purposes only.

Figure 1:
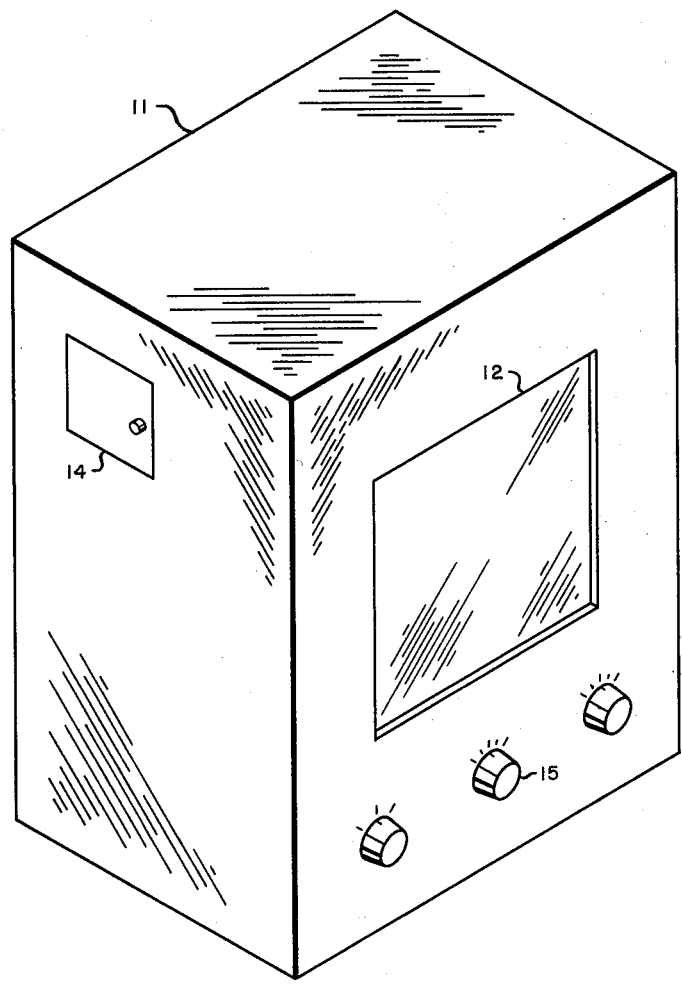
FIGURE 1 is an isometric drawing of a film viewer embodying a novel film spool drive and lock mechanism constructed according to the invention.

FIGURE 1 is an exterior view of the film viewer with its cover 11 in place. The cover has an opening 12 in the front surface through which the film may be seen. An access door 14 is provided for changing the film when necessary and all of the control knobs 15 are located immediately below the viewing area.

Figure 2:
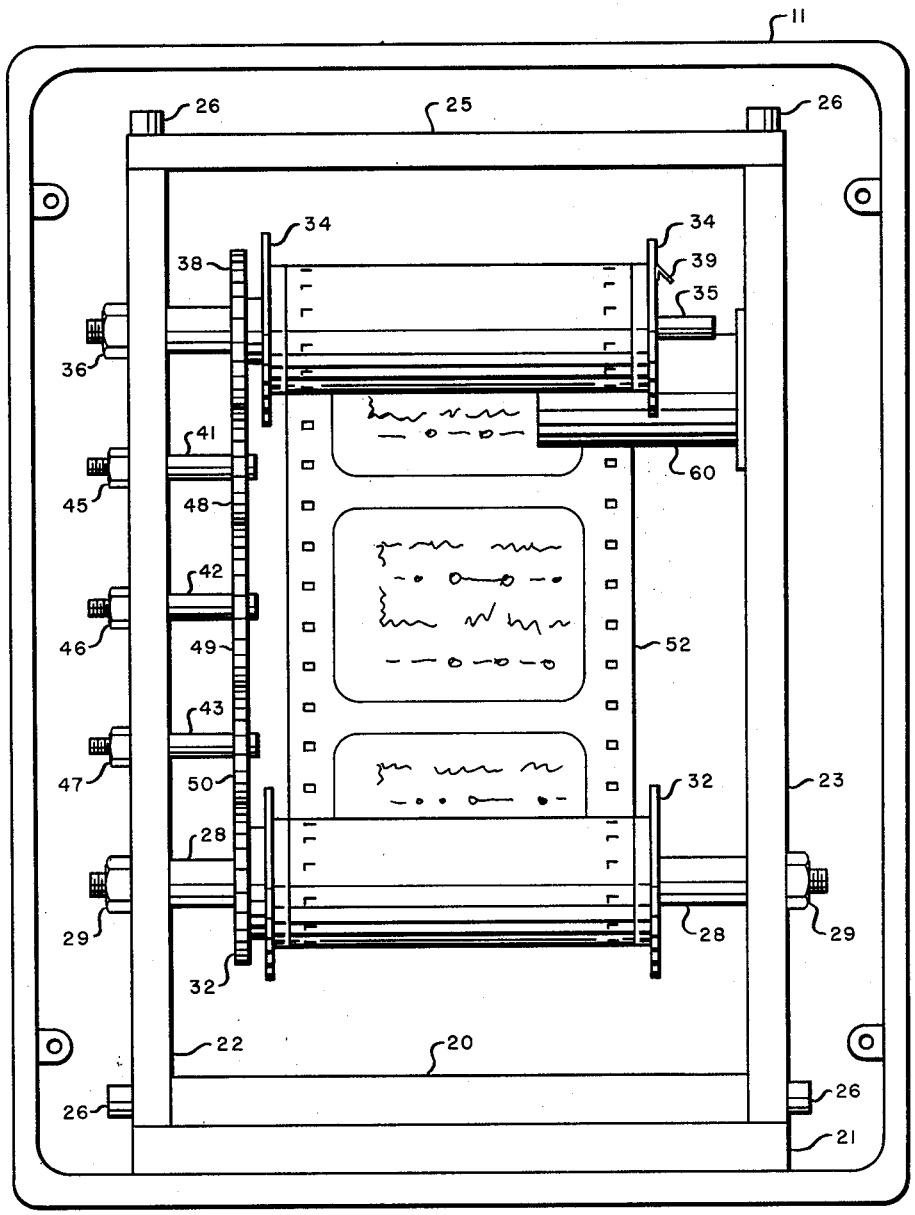
FIGURE 2 is a rear elevation of the viewer shown in FIGURE 1 with the back cover removed to reveal the contents.
Figure 3:
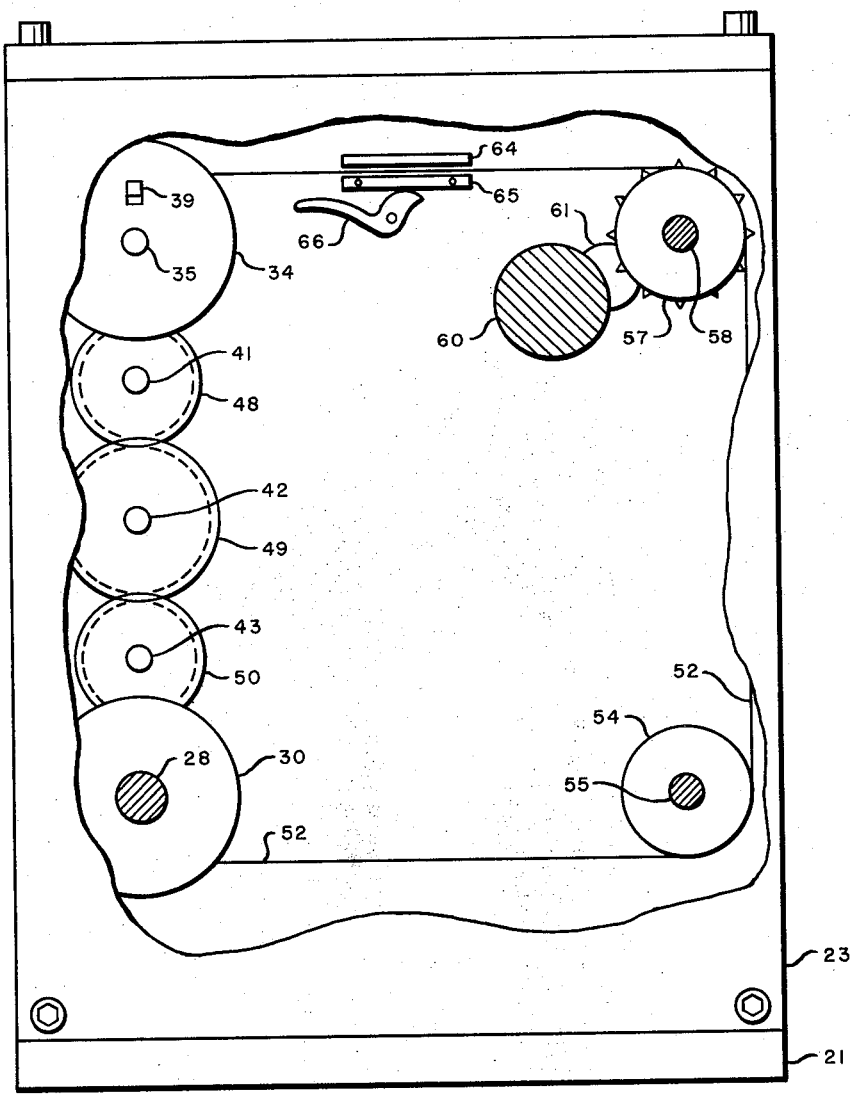
FIGURE 3 is a side elevation of the viewer shown in FIGURE 1 with the cover removed.

All of the essential operating components of the viewer are shown in FIGURES 2 and 3 where a base plate 20 mounted on a support 21 provides the bottom support for two vertical side walls 22 and 23 which are spaced from each other by an upper support and spacing member 25. The walls are secured to base plate 20 and to upper support member 25 by a plurality of screws 26.

A fixed shaft 28 is suspended between walls 22 and 23 and held in place by nuts 29. One of the film spools 30 is mounted for rotation on shaft 28 and is drivingly coupled by a conventional tensioning spring, not shown, to a gear 32 which is also mounted for rotation on fixed shaft 28.

Figure 4:
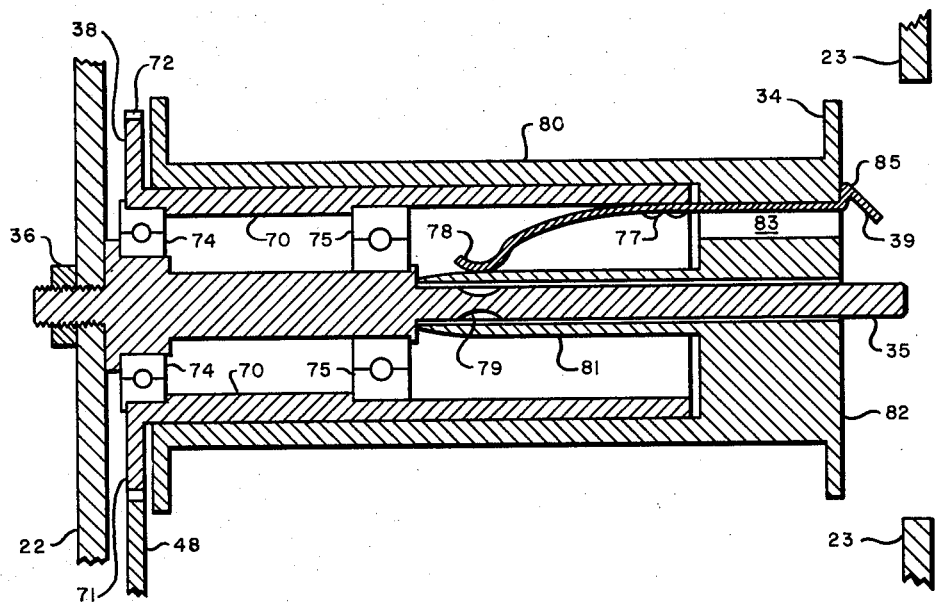
FIGURE 4 is a cross-sectional view of the spool drive and lock mechanism through the axis of rotation.

The removable spool 34 is mounted for rotation on a stub shaft 35 which is fixedly attached to wall 22 by a nut 36. A geared hub 38 is also mounted for rotation on stub shaft 35 and is coupled to removable spool 34 by a coupling spring 39, only a portion of which is shown in FIGURE 2. FIGURE 4, which will be described later, shows all of the constructional details of geared hub 38, coupling spring 39 and removable spool 34.

Three stub shafts, 41, 42 and 43, are mounted on wall 22 and held in place by nuts 45, 46 and 47, respectively. Gears 48, 49 and 50 are rotatably mounted on stub shafts 41, 42 and 43, respectively, and complete a gear drive train between geared hub 38 and gear 32. Thus, as the film 52 is drawn off of either spool, the other spool is driven a corresponding amount through the gear train to take up the film drawn off of the other spool.

The film 52 has one end wound on spool 30 and the other on spool 34. Intermediate the two spools it passes over an idler pulley 54 which is mounted for rotation on a fixed shaft 55 suspended between walls 22 and 23. In addition it passes over sprocket pulley 57 which is rotatably mounted on a shaft 58 supported by walls 22 and 23.

A motor 60, mounted on wall 23, drives sprocket pulley 57 through a Geneva movement which is not visible and a gear 61. The Geneva movement is conventional in all respects and converts the rotary motion of motor 60 into an intermittent rotary motion which causes the film 52 to advance one frame at a time past the viewing area. Any other type of intermittent movement may be employed since the particular movement used has no bearing on this invention.

The film after passing over the drive sprocket 57 passes between a fixed upper clamping member 64 and a lower moveable clamping member 65 which is actuated by a pivoted cam locking member 66. The clamp is necessary to prevent the unwinding of the tension spring within spool 30 and cooperates with the lock and drive mechanism shown in FIGURE 4 to prevent the unwinding of the fully-wound spring during film removal.

A leader has one end attached to spool 30 and its other to the film 52 by a sticker. Thus, when the film is to be changed, it is wound onto spool 34 and the leader is clamped between members 64 and 65 by actuating pivoted cam lock member 66. After the leader is locked spool 34 is removed and the sticker is disengaged. When another film is inserted, the above procedure is reversed.

The sectional view shown in FIGURES 4 is taken on a vertical plane cutting lengthwise through the axis of stub shaft 35 and it shows all the details of the novel drive and lock mechanism. Geared hub 38 has integral cylindrical and flange portions 70 and 71, respectively. Gear teeth 72 are cut in the periphery of the flange portion 71 and mate with the teeth on gear 48. The hub 38 is mounted for rotation on shaft 35 by ball bearings 74 and 75.

Coupling spring 39 is attached to the inner wall of cylindrical portion 70 by screws 77. A curved inner portion 78 of coupling spring 39 engages one of a plurality of notches 79 spaced about the periphery of stub shaft 35 when spool 34 is not in place thus locking geared hub 38 against rotation whenever spool 34 is removed from the position illustrated.

Spool 34 has a flanged outer cylindrical portion 80, which receives film 52, joined to an inner cylindrical portion 81 by an end section 82. An aperture or port 83 in end section 82 permits one end of coupling spring 39 to pass through the end section, and torque is transmitted by coupling spring 39 to spool 34 through the walls of port 83. Cylindrical portion 81 lifts the curved end 78 of spring 39 out of notches 79 thus releasing hub 38 from stub shaft 35, and the portion of spring 39 to the right of screws 77 simultaneously establishes a positive driving connection between geared hub 38 and spool 34. The detent 85 on spring 39 provides a positive lock which prevents spool 34 from moving to the right out of driving engagement.

Figure 5:
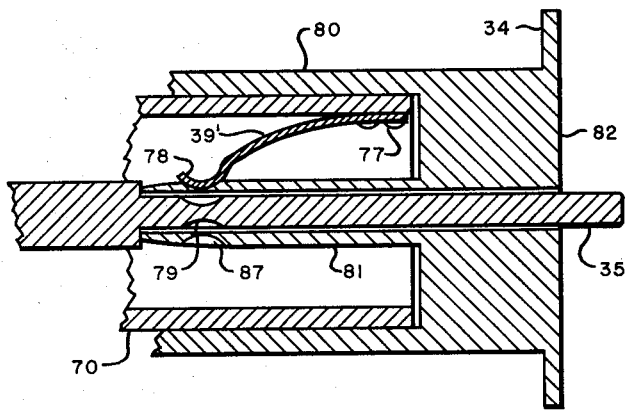
FIGURE 5 is a partial view similar to FIGURE 4 showing another embodiment of the invention.

The embodiment shown in FIGURE 5, which is a partial showing, is very much like that shown in FIGURE 4; however, the coupling spring 39' differs from spring 39 of FIGURE 4 since it does not pass through an aperture in spool 34. It drives the spool by engaging one of a plurality of axially extending slots or notches 87 in the wall of the inner cylindrical portion 81 of spool 34.

While two embodiments of the invention have been shown and described in detail for illustration purposes only, the invention is not limited to the specific details of the illustrated embodiment.

What is claimed is:

1. An automatic spool drive and lock mechanism comprising,
   a shaft,
   a hub including drive means mounted for rotation with respect to said shaft,
   a spool removably mounted on said shaft for rotation with respect thereto,
   and means fixed to said hub for driving by engaging said spool when said spool is mounted on the said shaft and for automatically disengaging the spool and engaging the shaft whenever the spool is removed to prevent relative rotation of the hub and shaft whenever the spool is removed.

2. An automatic spool drive and lock mechanism comprising,
   a shaft,
   a hub including drive means mounted on said shaft for relative rotation therewith,
   means fixed to said hub and biased into engagement with said shaft for preventing relative movement of the hub and shaft while so engaged,
   and a spool adapted for rotation with respect to said shaft when mounted in an operative position, said spool when occupying its said operative position simultaneously disengages said means fixed to the hub from the shaft and engages the said means to thereby provide a positive driving connection between the hub and the spool.

3. An automatic spool drive and lock mechanism comprising,
   a shaft having predetermined surface irregularities,
   a hub including drive means rotatably mounted on said shaft,
   means fixed to said hub and biased into engagement with the said predetermined surface irregularities on the said shaft for preventing relative rotation between the said hub and said shaft while so engaged,
   and a spool adapted for rotation with respect to said shaft when mounted in an operative position, said spool when mounted in its operative position engages the said biased means to establish a driving connection between the hub and the spool and at the same time disengages the biased means from the predetermined surface irregularities to permit relative rotation of the hub and spool with respect to the shaft.

4. An automatic spool drive and lock mechanism as set forth in claim 3 in which the said surface irregularities comprise at least one notch in the shaft having a pair of spaced parallel side walls extending in the axial direction, and said biased means fixed to said hub is a spring having a width smaller than the spacing between said parallel walls and biased so that it drops between said walls when not otherwise restrained.

5. An automatic spool drive and lock mechanism as set forth in claim 4 in which the said spool comprises, an outer cylindrical portion for supporting the material to be spooled, an inner cylindrical portion and an end portion joining the said outer and inner cylindrical portions, said inner cylindrical portion adapted to mount concentric with said shaft such that it displaces the spring and withdraws it from the notch in the shaft to free the hub, said inner cylindrical portion in addition has a notch similar to the notch in the shaft for receiving the displaced spring to establish a driving connection between the spool and the hub.

6. An automatic spool drive and lock mechanism as set forth in claim 4 in which the said spool comprises, an outer cylindrical portion for supporting the material to be spooled, an inner cylindrical portion and a ported end portion joining the said outer and inner cylindrical portions, said inner cylindrical portion adapted to mount concentric with said shaft such that it displaces the spring and withdraws it from the notch in the shaft to free the hub, and said ported end portion receives the said spring to establish a driving connection between the spool and the hub.

References Cited in the file of this patent
UNITED STATES PATENTS

| | | |
|---|---|---|
| 2,026,960 | Branch | Jan. 7, 1936 |
| 2,422,635 | Steiner | June 17, 1947 |